(12) United States Patent
Macy et al.

(10) Patent No.: US 10,744,992 B2
(45) Date of Patent: Aug. 18, 2020

(54) SEALING DEVICE FOR A DYNAMIC RESERVOIR

(71) Applicant: Robert Bosch GmbH, Stuttgart (DE)

(72) Inventors: Josh Macy, Plymouth, MI (US); Alejandro Martinez, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 15/980,372

(22) Filed: May 15, 2018

(65) Prior Publication Data

US 2019/0351888 A1   Nov. 21, 2019

(51) Int. Cl.
*B60T 17/06* (2006.01)
*B60T 11/26* (2006.01)

(52) U.S. Cl.
CPC ............... *B60T 17/06* (2013.01); *B60T 11/26* (2013.01)

(58) Field of Classification Search
CPC ................................ B60T 17/06; B60T 11/26
USPC ........................................................... 60/585
See application file for complete search history.

(56) References Cited

U.S. PATENT DOCUMENTS

| 3,861,557 A | 1/1975 | Tupper |
| 4,020,481 A * | 4/1977 | Nakagawa ............... G01F 23/74 340/624 |
| 4,086,394 A | 4/1978 | Tesch |
| 4,136,712 A * | 1/1979 | Nogami ................... B60T 11/22 137/493.8 |
| 4,165,816 A | 8/1979 | Tupper |
| 4,337,792 A * | 7/1982 | Nomura ................... B60T 11/22 137/558 |

(Continued)

FOREIGN PATENT DOCUMENTS

| DE | 102013005375 A1 * | 7/2014 | ............ B60T 13/142 |
| EP | 0376768 A1 | 7/1990 | |

(Continued)

OTHER PUBLICATIONS

Espacenet bibliographic data for the instant application US PG Pub 2019/0351888. (Year: 2020).*

Primary Examiner — James N Smalley
(74) Attorney, Agent, or Firm — Kathy Takeguchi; Maginot, Moore & Beck LLP

(57) ABSTRACT

A reservoir includes at least a container, a cap, a diaphragm, and a sealing device. The container includes a neck portion that extends from a body of the container. The neck portion includes an opening that provides access to an interior of the container. The cap is structured to interact with the neck portion. The cap includes a vent for pressure balancing of the reservoir. The diaphragm includes a slit that communicates with the vent. The sealing device includes a sealed vessel and a holder. The sealed vessel includes a sealing member sealed by a seal. The sealed vessel is movable to at least a first position such that the sealed vessel physically contacts the diaphragm to seal the slit. The sealed vessel is movable to a second position such that the sealed vessel is spaced from the diaphragm to unseal the slit. The holder is configured to hold the sealed vessel in alignment with the cap. The holder maintains a fixed position within the container when the sealed vessel moves from the first position to the second position. The holder maintains a fixed position within the container when the sealed vessel moves from the second position to the first position.

16 Claims, 8 Drawing Sheets

(56) References Cited

U.S. PATENT DOCUMENTS

| | | |
|---|---|---|
| 4,388,997 A | 6/1983 | Grime |
| 4,926,908 A | 5/1990 | Dschida |
| 5,025,628 A * | 6/1991 | Layman .................. B60T 11/26 |
| | | 60/585 |
| 5,081,914 A | 1/1992 | Mejia |
| 5,098,385 A | 3/1992 | Walsh |
| 5,269,431 A * | 12/1993 | Sakata ............... B60K 15/0406 |
| | | 220/203.17 |
| 5,586,436 A | 12/1996 | Sakaguchi et al. |
| 7,048,140 B1 | 5/2006 | Caldwell |
| 7,267,112 B2 | 9/2007 | Donahue et al. |
| 9,193,260 B2 | 11/2015 | Sotiriades et al. |
| 2003/0062371 A1 | 4/2003 | Hirao |

FOREIGN PATENT DOCUMENTS

| | | | |
|---|---|---|---|
| EP | 1108600 A2 | 6/2001 | |
| EP | 1626180 A1 | 2/2006 | |
| GB | 2154799 A * | 9/1985 | ............. H01H 35/18 |
| KR | 1020080101361 A1 | 11/2008 | |

* cited by examiner

SEALING DEVICE FOR A DYNAMIC RESERVOIR

FIELD OF THE INVENTION

This disclosure relates to sealing devices, and more particularly to sealing devices for reservoirs with vents.

BACKGROUND

In general, a brake fluid reservoir is configured to hold brake fluid, which may change with respect to fluid level, fluid volume (e.g., fluid expansion or fluid contraction), fluid temperature, or any combination thereof. When experiencing at least one of these changes to the brake fluid, the brake fluid reservoir may experience a change in pressure. For example, when the fluid level of brake fluid within the brake fluid reservoir increases (e.g., during fluid return in accordance with an operation of an anti-lock braking system (ABS) or an electronic stability program (ESP)), the brake fluid reservoir tends to experience an increase in pressure. Alternatively, when the fluid level of brake fluid within the brake fluid reservoir decreases, the brake fluid reservoir tends to experience a decrease in pressure. In this regard, the brake fluid reservoir includes a ventilation system for pressure balancing.

However, the ability to retain brake fluid within the brake fluid reservoir and the ability to provide ventilation are often at odds with each other. For example, under various conditions, such as during anti-lock braking, acceleration, deceleration, or the like, there is a tendency for brake fluid, when held within the brake fluid reservoir, to come into direct contact with the ventilation system that is intended for pressure regulation. For instance, if the fluid volume of brake fluid is increased in accordance with an operation of the ABS and/or the ESP, then this fluid volume increase may result in brake fluid being ejected or discharged from the brake fluid reservoir.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a reservoir includes at least a container, a cap, a diaphragm, and a sealing device. The container includes a neck portion that extends from a body of the container. The neck portion includes an opening that provides access to an interior of the container. The cap is structured to interact with the neck portion. The cap includes a vent for pressure balancing of the reservoir. The diaphragm includes a slit that communicates with the vent. The sealing device includes a sealed vessel and a holder. The sealed vessel includes a sealing member sealed by a seal. The sealed vessel is movable to at least a first position such that the sealed vessel physically contacts the diaphragm to seal the slit. The sealed vessel is movable to a second position such that the sealed vessel is spaced from the diaphragm to unseal the slit. The holder is configured to hold the sealed vessel in alignment with the cap. The holder maintains a fixed position within the container when the sealed vessel moves from the first position to the second position. The holder maintains a fixed position within the container when the sealed vessel moves from the second position to the first position.

In an example embodiment, a braking system includes at least one braking device and a reservoir. The reservoir is connected to the braking device. The reservoir includes at least a container, a cap, a diaphragm, and a sealing device. The container includes a neck portion that extends from a body of the container. The neck portion includes an opening that provides access to an interior of the container. The cap is structured to interact with the neck portion. The cap includes a vent for pressure balancing of the reservoir. The diaphragm includes a slit that communicates with the vent. The sealing device includes a sealed vessel and a holder. The sealed vessel includes a sealing member sealed by a seal. The sealed vessel is movable to at least a first position such that the sealed vessel physically contacts the diaphragm to seal the slit. The sealed vessel is movable to a second position such that the sealed vessel is spaced from the diaphragm to unseal the slit. The holder is configured to hold the sealed vessel in alignment with the cap. The holder maintains a fixed position within the container when the sealed vessel moves from the first position to the second position. The holder maintains a fixed position within the container when the sealed vessel moves from the second position to the first position.

These and other features, aspects, and advantages of the present invention are fluffier clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
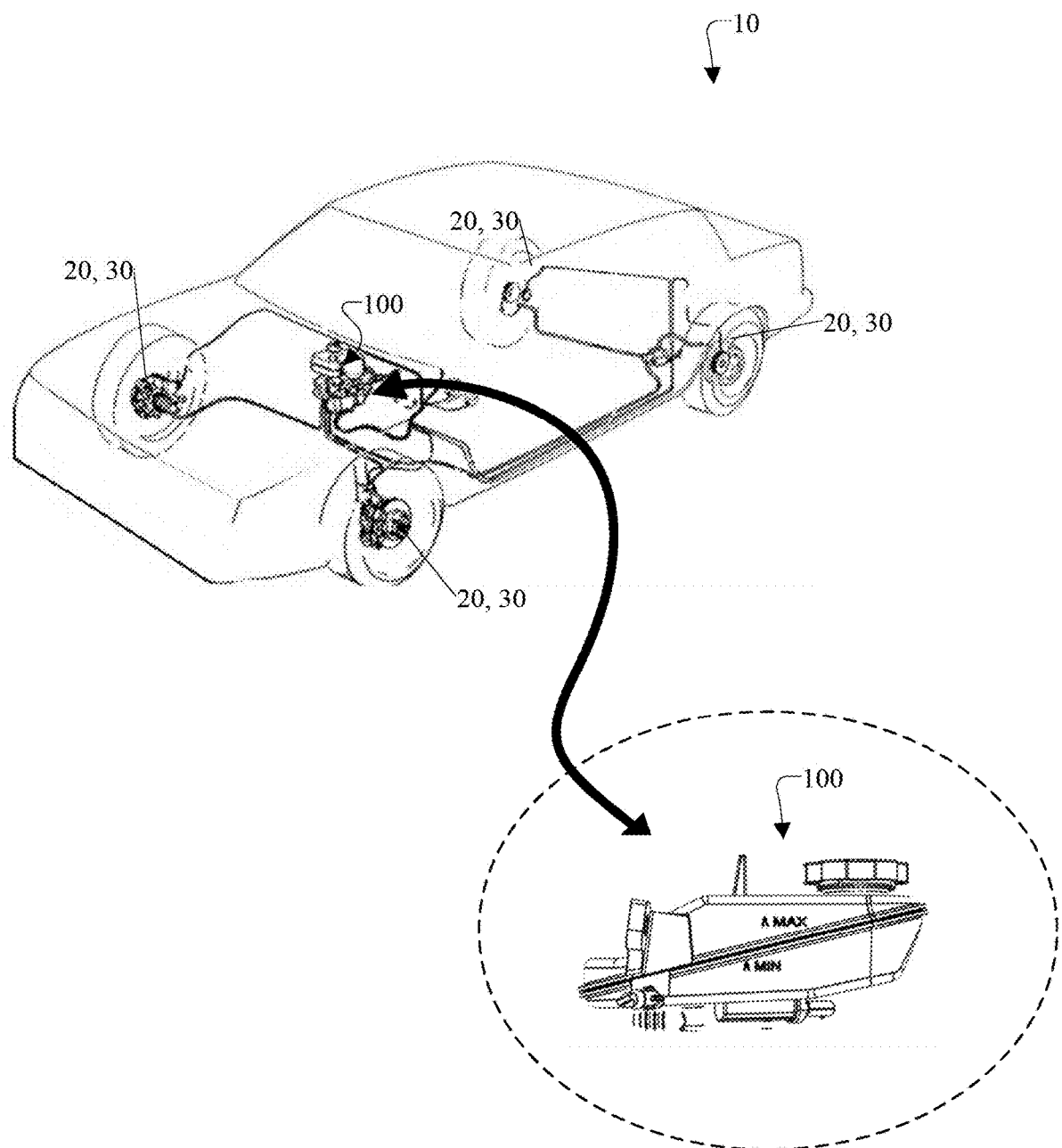
FIG. 1 is a view of a non-limiting example of a system with a reservoir according to an example embodiment of this disclosure.

FIG. 1 is an example of a system that includes a reservoir 100. In this example, the system is a vehicle 10 with a braking system that includes one or more braking devices 20, which correspond to one or more wheels 30 of the vehicle 10. In this regard, for example, the braking system is configured to interact with the reservoir 100 to provide brake fluid to the one or more braking devices 20. In FIG. 1, the reservoir 100 is configured to provide a suitable fluid, such as brake fluid, to the braking system. Although not shown in FIG. 1, the vehicle 10 and the braking system obviously include other components, which are known and not discussed in detail herein.

In an example embodiment, the reservoir 100 is dynamic and configured to experience a change in fluid level. For example, in some cases, the fluid level increases as brake fluid is flowed back into the reservoir 100 in accordance with an operation of the braking system. In other cases, the fluid level decreases as brake fluid flows out of the reservoir 100 in accordance with another operation of the braking system. The change in fluid level within the reservoir 100 changes the pressure level inside the reservoir 100. In this regard, the reservoir 100 includes a vent system to balance the pressure inside the reservoir 100. For example, when the brake fluid flows back into the reservoir 100, this operation tends to result in an increase in pressure, which is relieved via the vent system. In contrast, when the brake fluid flows out of the reservoir 100, this operation tends to result in a decrease in pressure. Additionally or alternatively, the pressure level within the reservoir 100 may change in other instances (e.g., volumetric changes of the fluid, temperature changes of the fluid, etc.), whereby the vent system is configured to provide pressure balancing.

Figure 2A:
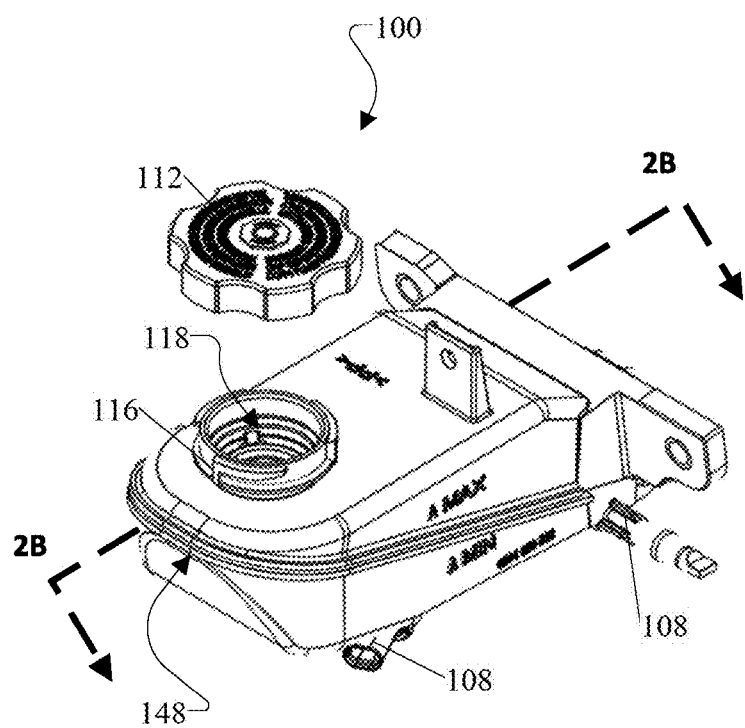
FIG. 2A is a perspective view of the reservoir according town example embodiment of this disclosure.
Figure 2B:
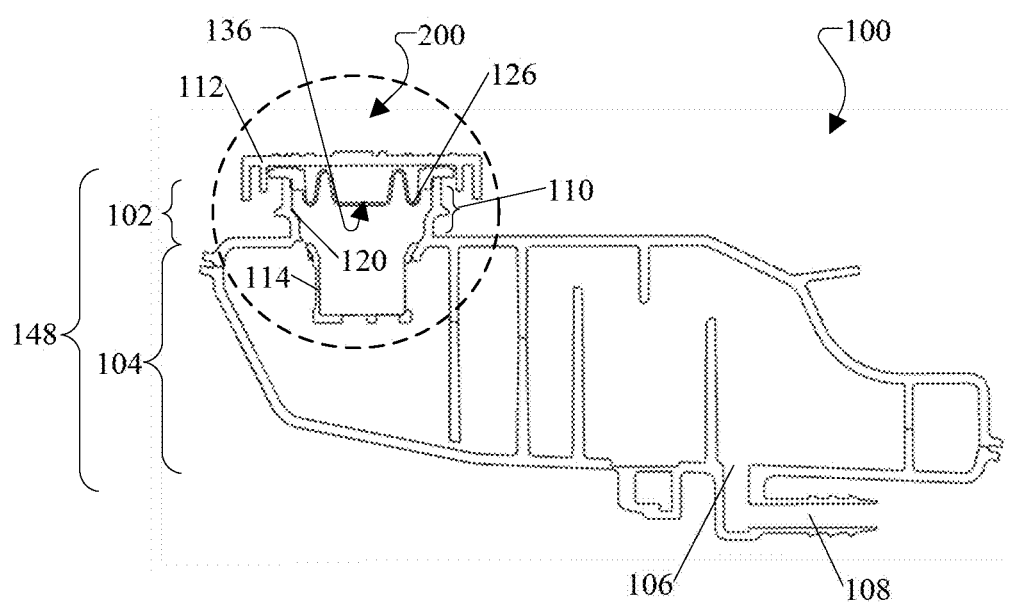
FIG. 2B is a cross-sectional view, taken along line 2B-2B of FIG. 2A, that shows the reservoir without the sealing device according to an example embodiment of this disclosure.

FIGS. 2A and 2B illustrate different views of the reservoir 100 according to an example embodiment. In an example embodiment, the reservoir 100 includes at least a container 148 and a cap 112. In an example embodiment, the container 148 includes an opening 118, which is configured to be covered by the cap 112. In addition, the container 148 includes at least a neck portion 102, a body portion 104, and one or more ports 106. In an example embodiment, the neck portion 102 is integral with the body portion 104 of the reservoir 100. In an example embodiment, the neck portion 102 is smaller than the body portion 104. As shown in FIG. 2B, for instance, the neck portion 102 includes a tapered portion 110, which is adjacent to the body portion 104. In an alternative embodiment (not shown), the neck portion 102 does not include a tapered portion 110. In an example embodiment, the neck portion 102 is structured to interact with the cap 112. In an example embodiment, for instance, the neck portion 102 includes a threaded portion 116 that is structured to engage with a corresponding threaded portion of the cap 112 so that the reservoir 100 is in an open state when the cap 112 is detached from the neck portion 102 and a closed state when the cap 112 is attached to the neck portion 102.

In an example embodiment, the neck portion 102 is structured to accommodate a filter 114. For example, in FIG. 2B, the tapered portion 110 includes inner surface portions 120 that are structured to support the filter 114. In this regard, the inner surface portions 120 and the filter 114 can include at least one coupling structure or mechanism to connect and couple the filter 114 to the inner surface portions 120. In an example embodiment, the filter 114 is configured to prevent foreign matter or foreign particles from contaminating the container 148 and any contents (e.g., brake fluid), which may be held within the container 148.

In an example embodiment, the body portion 104 is configured to hold contents while enabling a contents level to vary. For example, the contents level within the body portion 104 can increase when contents flow into the body portion 104 and decrease when contents flow out of the body portion 104. In addition, the body portion 104 is also able to maintain a steady level of contents. The contents can be any suitable substance. For instance, in an example embodiment, the contents, held by the body portion 104, include a suitable fluid, such as brake fluid.

In an example embodiment, the reservoir 100 includes ports 106, which are disposed at suitable positions along the container 148. In an example embodiment, the ports 106 are connected to corresponding conduits 108 to enable contents (e.g., brake fluid) to pass into and/or out of the reservoir 100. For instance, in FIG. 1, brake fluid is enabled to flow into and/or out of the body portion 104 of the reservoir 100 in accordance with deactivation and/or activation of the braking system. For example, the reservoir 100 is configured to experience at least an increase in fluid level or a decrease in fluid level via the ports 106 in the body of the container 148.

Figure 3A:
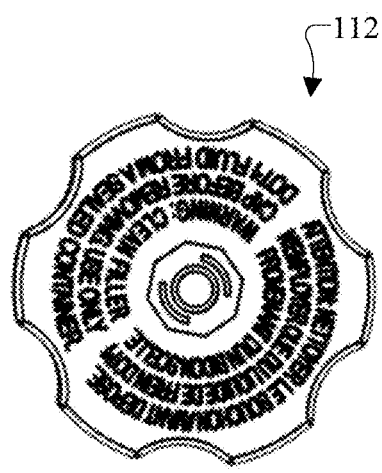
FIG. 3A is a top view of a cap according to an example embodiment of this disclosure.
Figure 3B:
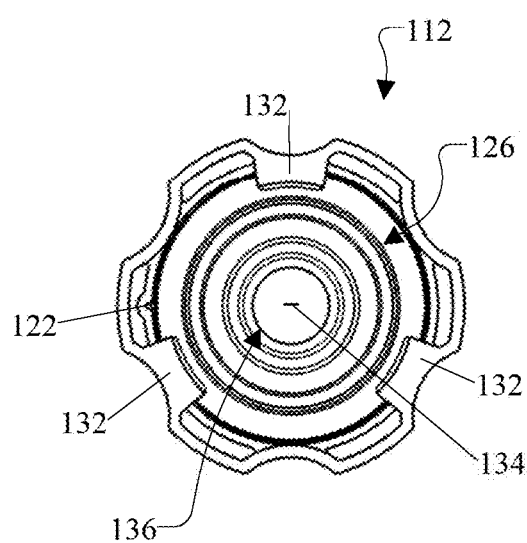
FIG. 3B is a bottom view of the cap of FIG. 3A along with a diaphragm according to an example embodiment of this disclosure.
Figure 3C:
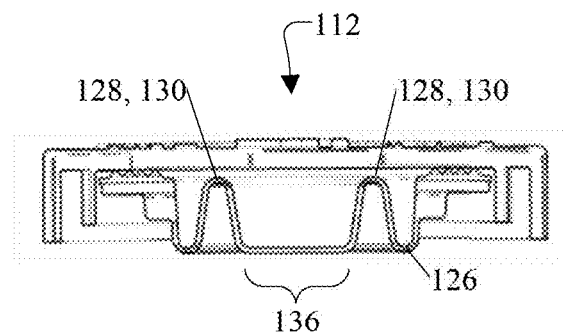
FIG. 3C is a cross-sectional view of a side of the cap of FIG. 3A along with a diaphragm according to an example embodiment of this disclosure.
Figure 3D:
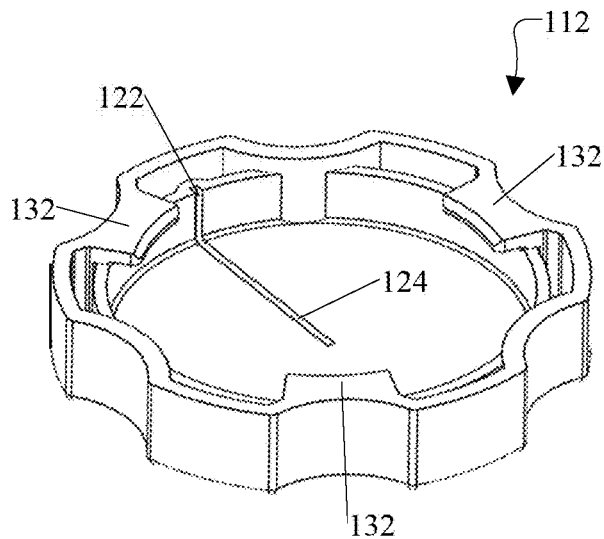
FIG. 3D is a perspective view of the cap of FIG. 3A according to an example embodiment of this disclosure.

FIGS. 3A, 3B, 3C, and 3D illustrate different views of at least the cap 112 according to an example embodiment. More specifically, FIGS. 3A and 3D illustrate the cap 112, while FIGS. 3B and 3C illustrate the cap 112 together with the diaphragm 126. In an example embodiment, the cap 112 is structured to provide a closed state with respect to the opening 118 of the reservoir 100 when engaged with the neck portion 102 and an open state with respect to the opening 118 of the reservoir 100 when disengaged and/or detached from the neck portion 102. In this regard, for instance, the cap 112 includes a threaded portion that is structured to interact with a corresponding threaded portion of the neck portion 102.

In an example embodiment, the cap 112 includes a vent 122 for balancing pressure within the reservoir 100. In an example embodiment, the vent 122 is located at any suitable part of the cap 112. For example, in FIG. 3B, the vent 122 is located at a peripheral portion of the cap 112. In an example embodiment, the vent 122 is a groove, slot, clearance, or a similar structure, which provides a passageway that is defined within the cap 112. More specifically, in FIGS. 3B and 3D, the vent 122 extends along an inner sidewall of the cap 112. Also, in an example embodiment, as shown in FIG. 3D, the cap 112 includes a channel 124 that communicates with the vent 122. In an example embodiment, the channel 124 is a groove, slot, clearance, or a similar structure, which provides a passageway that is defined within the cap 112. For example, in FIG. 3D, the channel 124 extends from an inner portion of the cap 112 to a peripheral portion of the cap 112. Also, as shown in FIG. 3D, the channel 124 connects to the vent 122. With this configuration, the channel 124 is configured to communicate with the slit 134, which is located at a corresponding inner portion of the diaphragm 126, and also with the vent 122, which is located at a peripheral portion of the cap 112.

In an example embodiment, the cap 112 is configured to interact with the diaphragm 126. In FIG. 3C, for instance, the cap 112 is in contact with the diaphragm 126. More specifically, in an example embodiment, the diaphragm 126 is configured to line at least a part of the cap 112. For example, in FIG. 3C, the cap 112 includes a groove 128 that is configured to receive a corresponding groove contour portion 130 of the diaphragm 126. In an example embodiment, the groove 128 and/or corresponding groove contour portion 130 are annular or ring-shaped. In this regard, the cap 112 and the diaphragm 126 are engaged and secured to each other.

In an example embodiment, the cap 112 includes one or more flanges 132. In an example embodiment, the flanges 132 are structured to support and hold the diaphragm 126 within the cap 112. In an example embodiment, the flanges 132 are disposed along the peripheral portion of the cap 112. In FIG. 3B, for example, the cap 112 includes three flanges 132, which are spaced equally around the peripheral portion of the cap 112. Also, in FIG. 3B, the flanges 132 extend from the rim towards an inner portion of the cap 112.

In an example embodiment, the diaphragm 126 is structured to isolate and separate external air from the contents (e.g., brake fluid) held within the container 148. This feature is advantageous, for example, in preventing at least moisture from the air from being introduced into the reservoir 100. In an example embodiment, the diaphragm 126 is a flexible membrane. In an example embodiment, the diaphragm 126 comprises rubber, neoprene, any suitable material, or any combination thereof. In an example embodiment, the diaphragm 126 is configured to engage with the cap 112. In this regard, for instance, the diaphragm 126 is configured to cover at least an inner portion of the cap 112 while being held by or incorporated into the cap 112. In an example embodiment, the diaphragm 126 has a peripheral portion that overlaps and/or engages with the flanges 132 of the cap 112. Also, in an example embodiment the diaphragm 126 includes a slit 134. In an example embodiment, for instance, as shown in FIGS. 3B and 3C, the slit 134 is positioned within the slit region 136. In an example embodiment, the slit region 136 is located in an inner region of the diaphragm 126 that is surrounded by the groove contour portion 130. In an example embodiment, the slit 134 is in communication with the vent 122. For example, in FIG. 3D, the slit 134 provides a passageway, which is configured to communicate with the vent 122 via the channel 124.

Figure 4A:
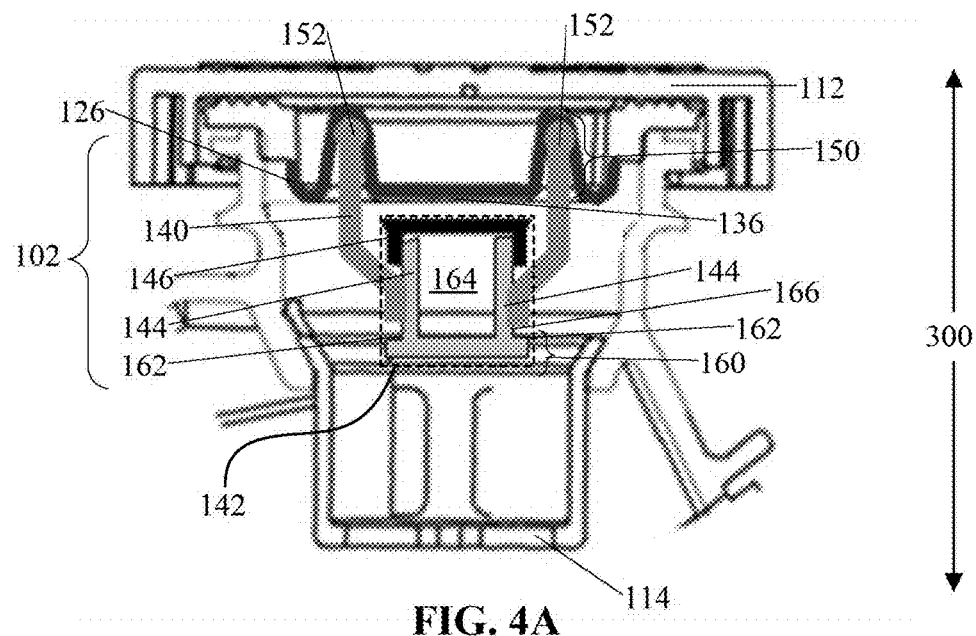
FIG. 4A is an enlarged view of the circled region of FIG. 2B with a first example of the sealing device in an unsealed position according to an example embodiment of this disclosure.
Figure 4B:
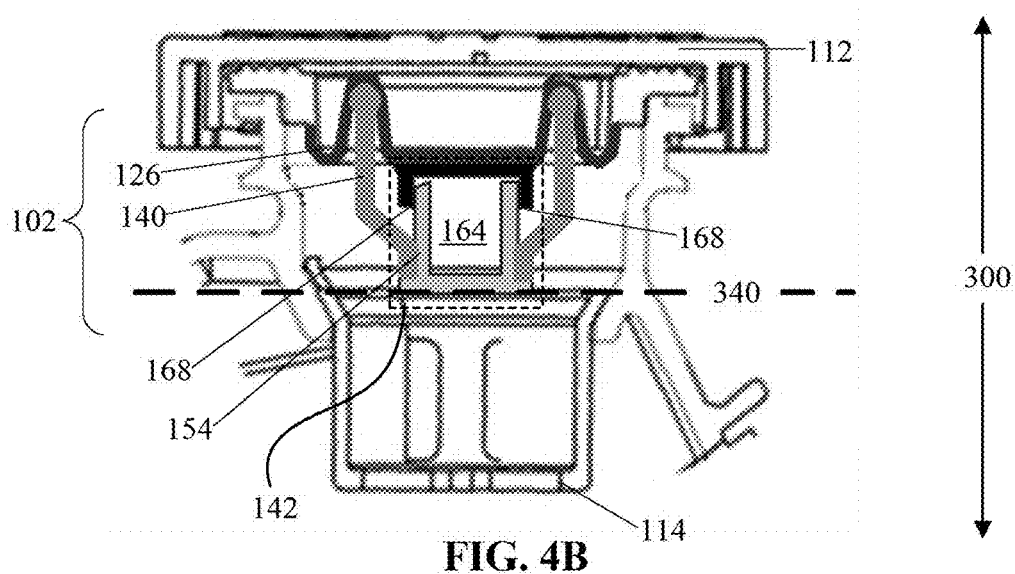
FIG. 4B is an enlarged view of the circled region of FIG. 2B with a first example of the sealing device in a sealed position according to an example embodiment of this disclosure.

FIGS. 4A and 4B are cross-sectional views of a first example 138A of the sealing device 138 according to an example embodiment. In an example embodiment, the sealing device 138A includes at least a holder 140 and a sealed vessel 142. In an example embodiment, the sealed vessel 142 includes at least a sealing member 144 and a seal 146. In this regard, for instance, the sealing member 144 contains air 164 and is sealed by the seal 146 to form the sealed vessel 142. In an example embodiment, the sealing device 138A is configured to be disposed within the container 148. For example, in at least FIGS. 4A and 4B, the sealing device 138A is configured to be positioned within the neck portion 102 of the container 148. Also, in an example embodiment, as shown in FIGS. 4A and 4B, the sealing device 138A is positioned between the cap 112 and the filter 114, and more specifically between the diaphragm 126 and the filter 114.

In an example embodiment, the holder 140 is configured to maintain a fixed position within the container 148 when disposed within the container 148. For example, in FIGS. 4A and 4B, the holder 140 is fixed, connected, or secured to the diaphragm 126 and the cap 112. In this regard, for instance, the holder 140 includes at least an attachment portion 150. In at least FIGS. 4A and 4B, the attachment portion 150 includes an outer rim portion of the holder 140. In an example embodiment, the attachment portion 150 includes a mating component that is configured to mate with the mating component of the cap 112, the mating component of the diaphragm 126, or both the mating components of the cap 112 and the diaphragm 126. For example, in FIGS. 4A and 4B, the holder 140 includes a knob-like rim portion 152 (or any suitable mechanical structure 152), which is configured to fit into and engage with the groove 128 of the cap 112 and the corresponding groove contour portion 130 of the diaphragm 126. In this regard, when attached, the holder 140 is secured to both the cap 112 and the diaphragm 126. In addition, as shown in at least FIGS. 4A-4C and 5A-5C, the holder 140 is spaced from the inner surface portions 120 of the neck portion 102 such that there is sufficient clearance between the holder 140 and the inner surface portions 120 of the neck portion 102. In this regard, for instance, each cross-section of the holder 140 is smaller than a corresponding cross-section of the neck portion 102 such that there is clearance between the outer sidewalls of the holder and the inner surface portions 120 of the neck portion 102 when the holder 140 is positioned within the neck portion 102. This feature is advantageous in enabling the sealing device 138 (e.g., sealing device 138A or 138B) to be removed with the cap 112 with ease.

Figure 4C:
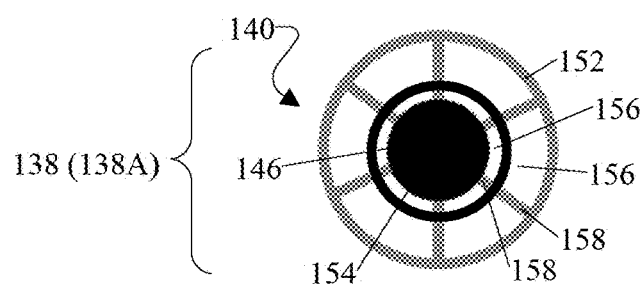
FIG. 4C is a top view of the sealing device of FIG. 4A according to an example embodiment of this disclosure.

In an example embodiment, the holder 140 is configured to interact with and support the sealed vessel 142. In an example embodiment, the holder 140 includes a guide slot 154. In an example embodiment, the guide slot 154 is aligned with an inner opening of the channel 124 on the inner region of the cap 112. Also, in an example embodiment, the guide slot 154 is aligned with the slit region 136 of the diaphragm 126. In an example embodiment, as shown in FIGS. 4A-4C, for instance, the guide slot 154 is provided in a central region of the holder 140. Also, in an example embodiment, as shown in at least FIGS. 4A-4B, the holder 140 is tapered such that a width of the guide slot 142 (and/or the corresponding portion of the holder 140 in which the guide slot 154 is defined) is less than a width of the rim portion 152 (or the attachment portion 150). In an example embodiment, the guide slot 154 is structured to receive the sealed vessel 142 such that the sealed vessel 142 is guided by the inner sidewalls of the guide slot 154 to move to at least an unsealed position ("first position"), as shown in FIG. 4A, and a sealed position ("second position"), as shown in FIG. 4B. This feature is advantageous in maintaining the sealed vessel 142 in direct alignment with the slit region 136 of the diaphragm 126, thereby ensuring that the sealed vessel 142 moves along the fastest and most direct route to seal the slit 134 such that contents (e.g. brake fluid) within the container 148 do not contact the slit 134.

In an example embodiment, the holder 140 includes one or more passageways 156, which advantageously enable pressure balancing by providing an open pathway to the slit 134 and thus the vent 122. In addition, each passageway 156 is structured to enable contents (e.g., brake fluid) to pass through the holder 140. In FIG. 4C, for instance, the holder 140 includes a plurality of passageways 156 that are positioned between the guide slot 154 and the rim portion 152. In an example embodiment, each of the plurality of passageways 156 is separated by a rib portion 158 of the holder 140. In an example embodiment, each rib portion 158 extends radially from the rim portion 152 to the guide slot 154. In this regard, for example, the holder 140 is advantageously configured such that passage to the vent system (e.g., slit 134, channel 124, vent 122, etc.) is provided when the sealed vessel 142 is in the unsealed position while also being configured such that the sealed vessel 142 is held adjacent to and in close proximity to the vent system for quick sealing. In addition, the inclusion of the passageways 156 enables the holder 156 to be relatively light-weight, thereby providing material savings benefits.

In an example embodiment, the sealing member 144 is movable along an axis 300. For example, the sealing member 144 is movable along the axis 300 to at least the first position in Which the seal 146 is spaced from the diaphragm 126 to unseal the slit region 136 and provide pressure balancing to the reservoir 100. Also, the sealing member 144 is movable along the axis 300 to at least the second position in which the seal 146 seals the slit region 136 so that contents (e.g., brake fluid) of the container 148 do not escape from the vent system of the reservoir 100, thereby preventing leakage, spillage, or discharge of brake fluid from the reservoir 100. In this regard, for example, when the sealing member 144 is in the second position, the seal 146 is in direct physical contact with at least the slit region 136 of the diaphragm 126 to provide a tight and effective seal for the slit 134 of the diaphragm 126, thereby preventing contents (e.g., brake fluid) from coming into contact with the slit region 136.

In an example embodiment, the sealing member 144 is a generally elongated and hollow body structure, which is configured to move within the guide slot 154. In an example embodiment, the sealing member 144 comprises polypropylene or any suitable material. In an example embodiment, the sealing member 144 includes a shoulder portion 160, which protrudes from the body of the sealing member 111. In an example embodiment, the shoulder portion 160 provides an abutment surface 162 and thus serves as a stopper. In this regard, for example, when the contents (e.g., brake fluid) moves the sealing member 144 by a predetermined amount, the abutment surface 162 is structured to abut against a surface 166 of the holder 140. As shown in FIGS. 4A and 4B, for instance, the abutment surface 162 ensures that the sealing member 144 does not move beyond a predetermined amount, which is necessary to provide an effective seal of the slit region 136. In addition, although not provided in the embodiment of FIGS. 4A-4B, the sealing member 144 can include another shoulder portion, which extends from an opposite end portion of the sealing member 144 so that the sealing member 144 does not pass through the guide slot 154 when in the unsealed position.

In an example embodiment, the sealing member 144 is sealed by the seal 146. In this regard, when sealed by the seal 146, the sealing member 144 is a sealed vessel 142 of defined volume. In an example embodiment, a density of the sealed vessel 142 is less than a density of the fluid so that the sealed vessel 142 is buoyant and moves in accordance with a fluid level of the fluid contained within the reservoir 100. More specifically, in an example embodiment, the sealed vessel 142 contains air 164 within an interior region defined by the sealing member 144 and the seal 146, thereby being buoyant and movable in accordance with a fluid level of a suitable fluid (e.g., brake fluid) within the reservoir 100. In this regard, for example, when at least a part of the fluid level of the brake fluid is approximately equal to, equal to, or greater than a predetermined level 340, then the sealed vessel 142 is motivated via its buoyancy to be at the sealed position in accordance with that fluid level at that instance. In contrast, when the fluid level is less than the predetermined level 340 (and the fluid is in contact with the sealed vessel 142), then the sealed vessel 142 is motivated via its buoyancy to be at the unsealed position in accordance with that fluid level at that instance. Alternatively, when the fluid level is less than the predetermined level 340 (and fluid does not contact or influence the sealed vessel 142), then the sealed vessel 142 is motivated via gravity to be at the unsealed position while being held by the holder 140 so that the sealed vessel 142 remains within a suitable region (e.g. neck portion 102) of the container 148.

In an example embodiment, when the sealed vessel 142 is in the sealed position, the seal 146 is structured to provide a tight and effective seal with respect to the slit 134 in the diaphragm 126 so that fluid does not come into contact with and/or escape from the reservoir 100, especially under dynamic conditions. In an example embodiment, the seal 146 is structured to cover at least the slit 134. In FIG. 4B, for example, the seal 146 is structured to cover the entire slit region 136 of the diaphragm 126. In this regard, the seal 146 comprises a brake fluid compatible rubber, such as ethylene propylene diene monomer (EPDM), vinyl, any suitable material, or any combination thereof.

In an example embodiment, the seal 146 is structured to completely cover an open end portion of the sealing member 144. In this regard, the seal 146 forms a part of the sealed vessel 142. In an example embodiment, the seal 146 has a cap-like structure with an inner surface portion that overlaps an outer surface portion of the sealing member 144. In an example embodiment, the seal 146 includes at least one surface portion 168, which is structured to serve as a stopper. In this regard, for instance, the seal 146 is structured to abut against the holder 140 to prevent the sealed vessel 142 from passing through the holder 140 via gravity, for example, when the fluid does not contact the sealed vessel (e.g., when the fluid level is low or when there is no fluid in the reservoir 100).

Figure 5A:
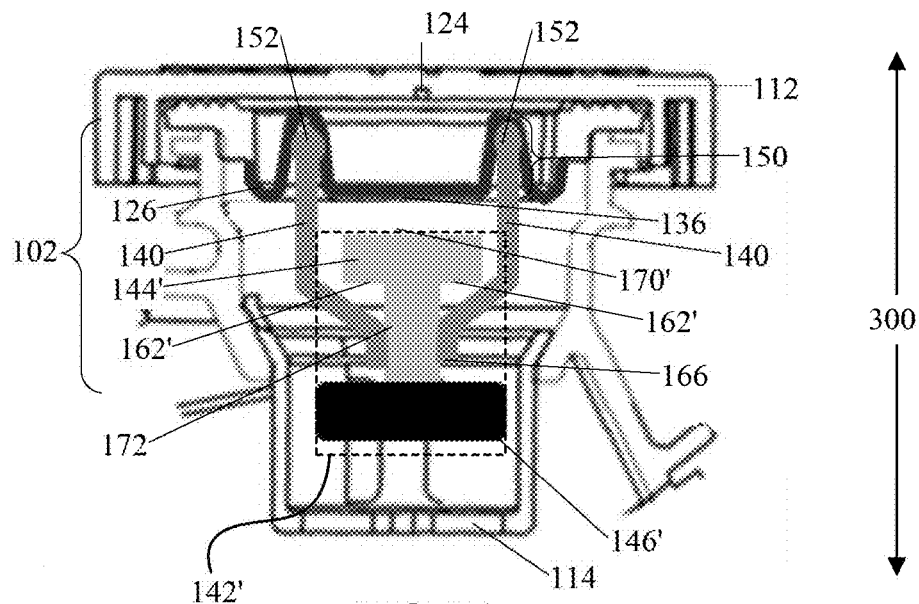
FIG. 5A is an enlarged view of the circled region of FIG. 2B with a second example of the sealing device in an unsealed position according to an example embodiment of this disclosure.
Figure 5B:
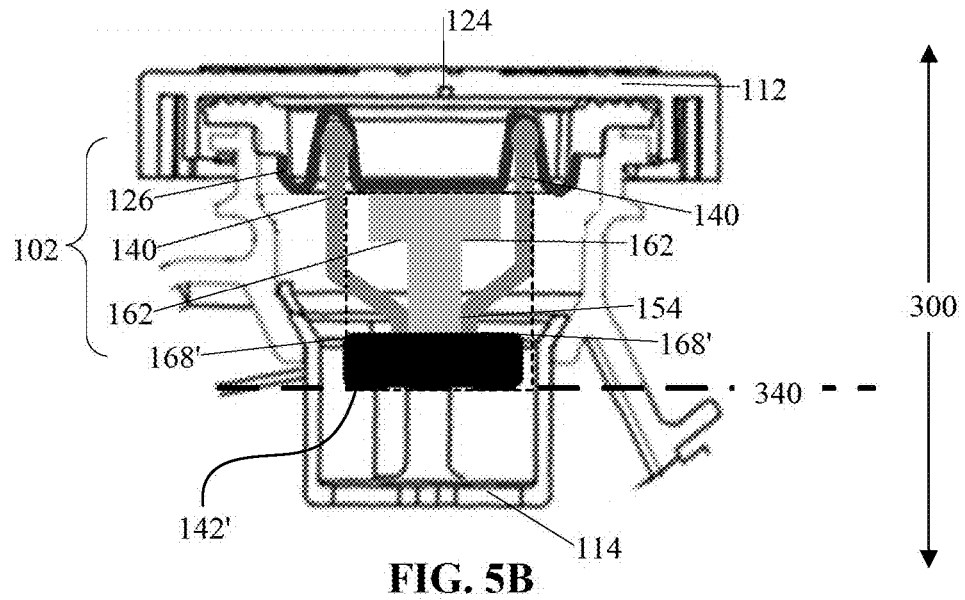
FIG. 5B is an enlarged view of the circled region of FIG. 2B with a second example of he sealing device in a sealed position according to an example embodiment of this disclosure.
Figure 5C:
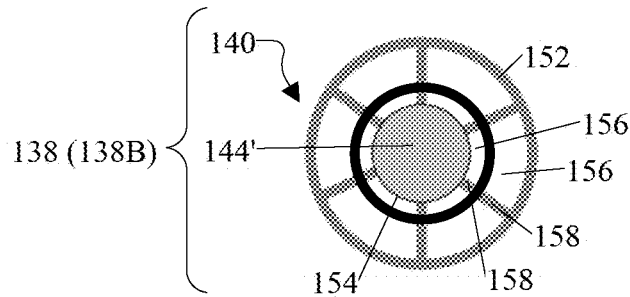
FIG. 5C is a top view of the sealing device of FIG. 5A according to an example embodiment of this disclosure.

FIGS. 5A-5C, 6A-6C, and 7A-7C illustrate different views of various alternative embodiments of the sealing device 138. That is, as demonstrated by at least FIGS. 5A-5C, 6A-6C, and 7A-7C, the sealing device 138 is not limited to the configuration set forth in FIGS. 4A-4C, but can include several similar features as that of FIGS. 4A-4C along with some variations and/or modifications. More specifically, as one example, FIGS. 5A-5C illustrate an embodiment in which the sealing device 138B includes the holder 140, but includes an alternative sealed vessel 142' instead of the sealed vessel 142. In an example embodiment, the sealed vessel 142' is configured such that the sealing member 144' is oriented and structured to seal the slit region 136 of the diaphragm 126. In this regard, the sealing member 144' includes the sealing portion 170' that engages with the slit region 136 of the diaphragm 126. In addition, the sealing member 144' includes an abutment surface 162' that is configured to serve as a stopper to prevent the sealed vessel 142' from passing through the guide slot 154 via gravity when the fluid level decreases or is low. In an example embodiment, the sealing member 144' includes an elongated body portion 172, which is structured to move within the guide slot 154. Also, in an example embodiment, the sealing member 144' has an end surface portion that is sealed by the seal 146' so that the sealing member 144' together with the seal 146' form a buoyant sealed vessel 142' similar to the sealed vessel 142 of FIGS. 4A-4C. In an example embodiment, the seal 146' covers an entire end portion of the sealing member 144' so that air 164 or another suitable substance is sealed in the sealed vessel 142' for buoyancy. In FIGS. 5A and 5B, the seal 146' is wider than the body portion 172 of the sealing member 144'. In addition, as shown in FIGS. 5A and 5B, the seal 146' is wider than the guide slot 154 of the holder 140. In an example embodiment, the seal 146' includes an abutment surface 168', which is configured to abut against at least one surface 166 of the holder 140. This feature enables the sealed vessel 142' to move a predetermined amount along the axis 300 and provide an effective seal 146' for the slit region 136 of the diaphragm 126.

Figure 6A:
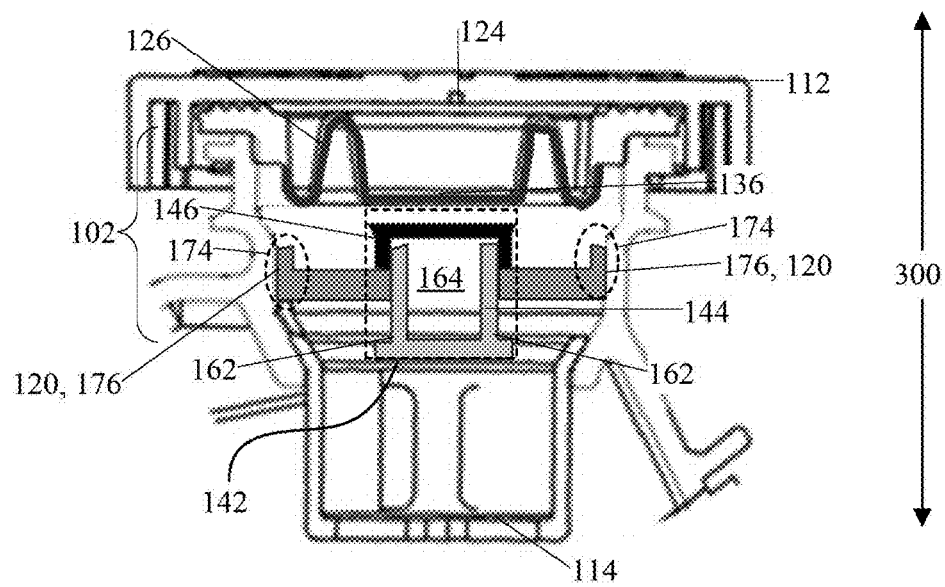
FIG. 6A is an enlarged view of the circled region of FIG. 2B with a third example of the sealing device in an unsealed position according to an example embodiment of this disclosure.
Figure 6B:
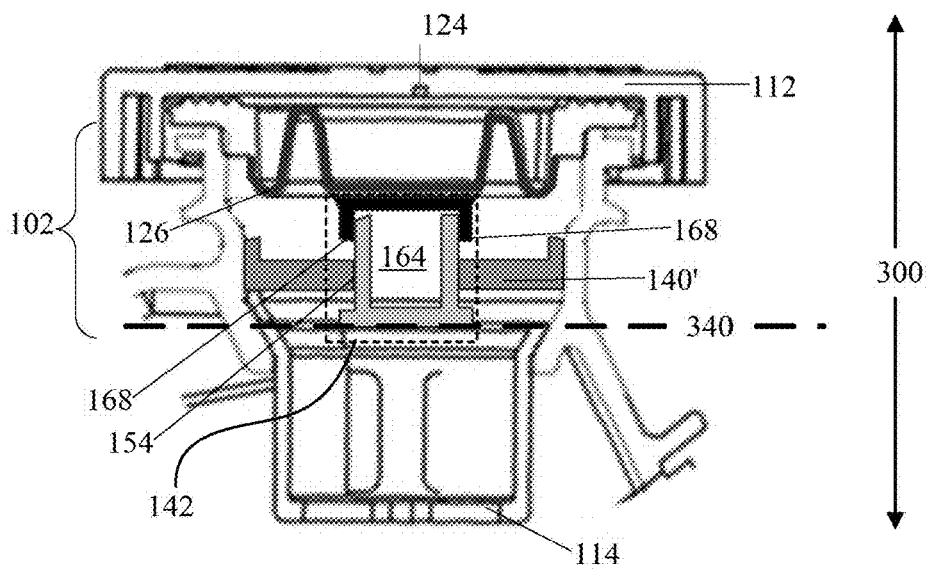
FIG. 6B is an enlarged view of the circled region of FIG. 2B with a third example of the sealing device in a sealed position according to an example embodiment of this disclosure.
Figure 6C:
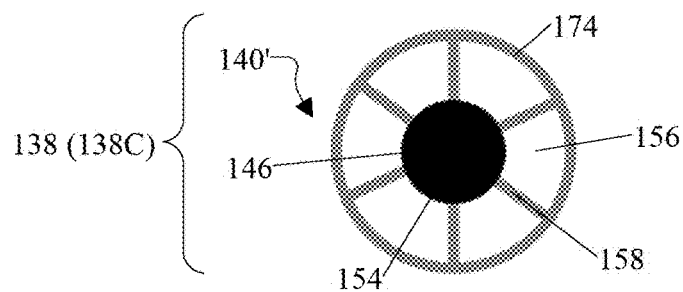
FIG. 6C is a top view of the sealing device of FIG. 6A according to an example embodiment of this disclosure.

FIGS. 6A-6C illustrate the sealing device 138 according to yet another alternative embodiment. In FIGS. 6A-6C, the sealing device 138C includes the sealed vessel 142 of FIGS. 4A-4C, but includes an alternative holder 140' instead of the holder 140. In an example embodiment, the holder 140' includes the guide slot 154 of FIGS. 4A-4C. However, the holder 140' is structured to connect with inner surface portions 120 of the neck portion 102 of the container 148. In an example embodiment, the holder 140' includes a rim portion 174 with a rim surface 176 that has a height that is greater than a height of other portions of the holder 140'. In this regard, the rim surface 176 provides the holder 140' with a relatively large surface area, which is configured to engage with and connect with the inner surface portions 120 of the neck portion 102. In an example embodiment, the holder 140' is snap-fit or press-fit into the neck portion 102. Additionally or alternatively, the holder 140' and/or the corresponding inner surface portions 120 include at least one coupling structure or mechanism to connect and couple the holder 140' to the neck portion 102. That is, the holder 140' is structured to engage with and connect to the neck portion 102 to maintain a fixed position within the neck portion 102. In addition, as shown in FIG. 6C, the holder 140' includes one or more passageways 156, ribs 158, and the guide slot 154.

Figure 7A:
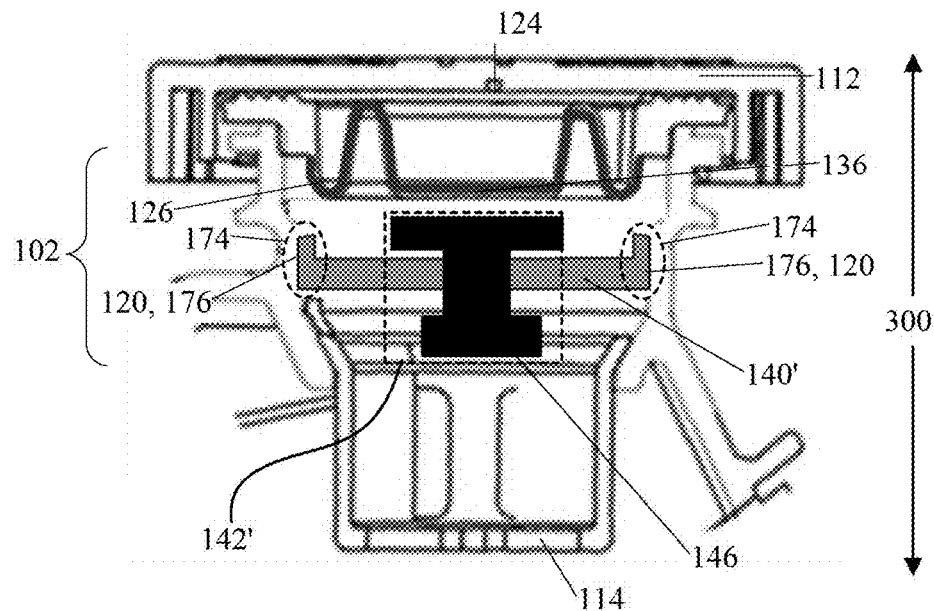
FIG. 7A is an enlarged view of the circled region of FIG. 2B with a fourth example of the sealing device in an unsealed position according to an example embodiment of this disclosure.
Figure 7B:
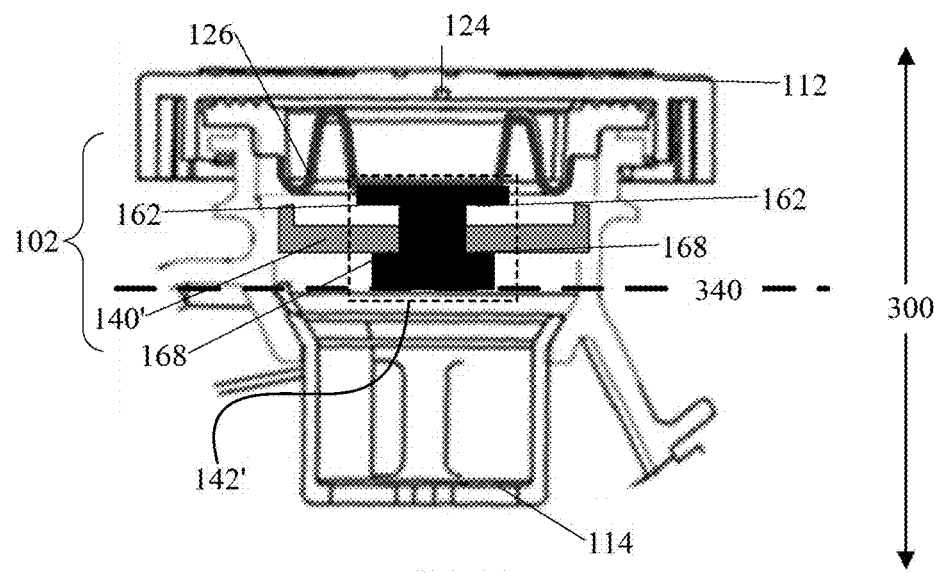
FIG. 7B is an enlarged view of the circled region of FIG. 2B with a fourth example of the sealing device in a sealed position according to an example embodiment of this disclosure.
Figure 7C:
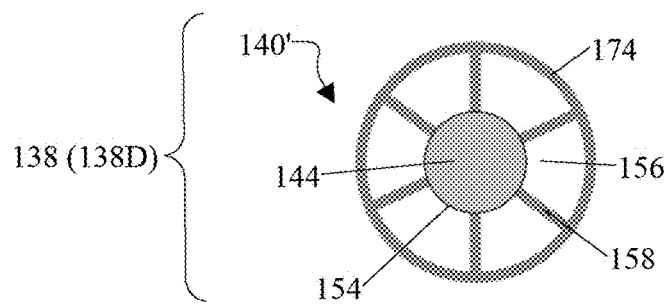
FIG. 7C is a top view of the sealing device of FIG. 7A according to an example embodiment of this disclosure.

FIGS. 7A-7C illustrate the sealing device 138 according to yet another alternative embodiment. In FIGS. 7A-7C, the sealing device 138D includes the holder 140' of FIGS. 6A-6C. In addition, as shown in FIGS. 7A and 7B, the sealing device 138D includes the sealed vessel 142' of FIGS. 5A and 5B. That is, the holder 140' and the sealed vessel 142' include the features, as discussed above. Accordingly, as demonstrated by each of the aforementioned example embodiments, the reservoir 100 can include the sealing device 138 of any one of the various embodiments, such as sealing device 138A (FIGS. 4A-4C), sealing device 138B (FIGS. 5A-5C), sealing device 138C (FIGS. 6A-6C), or sealing device 138D (FIGS. 7A-7C). In each of these cases, the sealing device 138 advantageously provides an effective sealing mechanism that enables ventilation and pressure balancing when in the unsealed position and prevents fluid contact and leakage with the diaphragm 126 when in the sealed position.

Figure 8A:
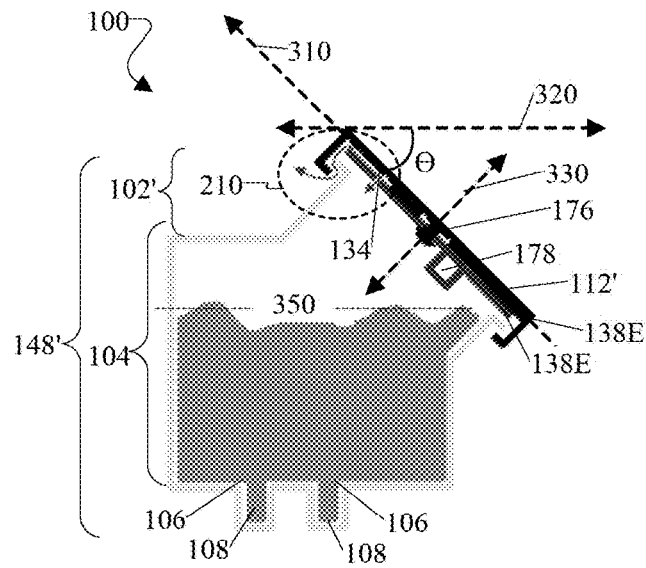
FIG. 8A is a view of another example of a reservoir with a sealing device in which the sealing device is rotated into an unsealed position according to an example embodiment of this disclosure.
Figure 8B:
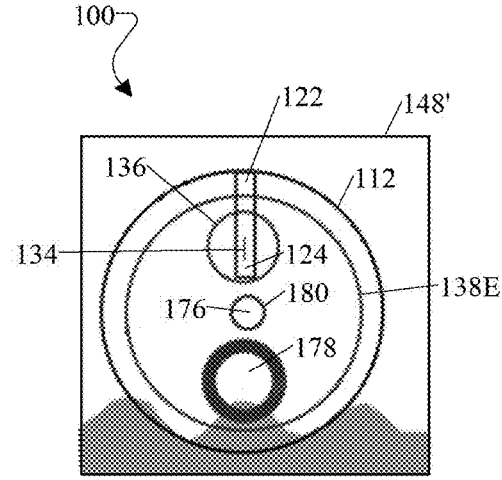
FIG. 8B is a cross-sectional view of the reservoir of FIG. 8A according to an example embodiment of this disclosure.
Figure 9A:
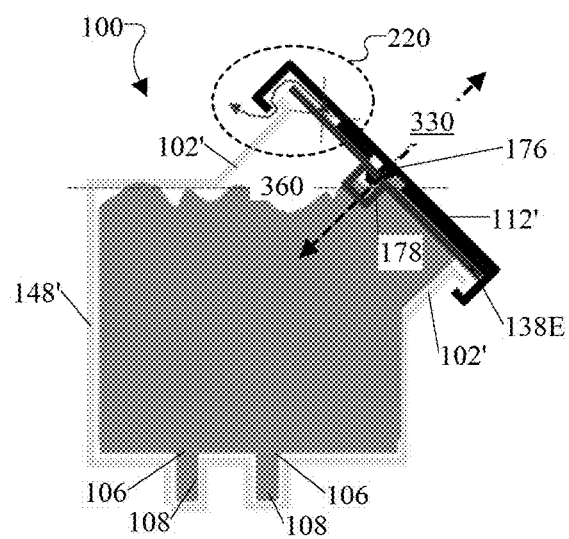
FIG. 9A is a view of the sealing device of FIG. 8A in which the sealing device is rotated into a sealed position according to an example embodiment of this disclosure.
Figure 9B:
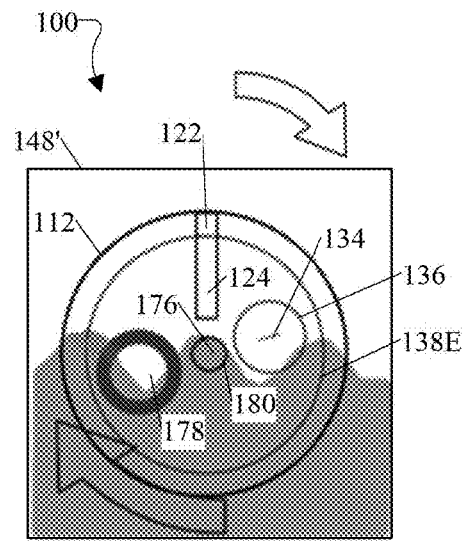
FIG. 9B is a cross-sectional view of the reservoir of FIG. 9A according to an example embodiment of this disclosure.

FIGS. 8A-8B and 9A-9B illustrate another example of the reservoir 100 with another example of a sealing device 138 according to an example embodiment. In an example embodiment, the reservoir 100 includes at least a container 148', a cap 112', and a sealing device 138E. In an example embodiment, the container 148' includes, a number of features that are similar to those features, which were discussed above in earlier embodiments. In addition, the container 148' also includes a number of different features compared to that of the container 148 of the earlier embodiments. For example, the neck portion 102', as shown in FIGS. 8A and 9A, is angled so that the cap 112' extends along axis 310 and is situated at an acute angle Θ with respect to horizontal axis 320 when engaged with the neck portion 102'. In an example embodiment, the cap 112' includes the channel 124 and the vent 122 for pressure balancing. Also, in an example embodiment, the cap 112' includes a pin 176, which enables the sealing device 138E to move (e.g. rotate) into the unsealed position and the sealed position in accordance with the conditions and fluid level of the reservoir 100. In an example embodiment, the pin 176 extends from a central portion of the cap 112' and is coaxial with a rotational axis 330 of the sealing device 138E. In an example embodiment, the pin 176 is configured to extend through an aperture 180 in the sealing device 138E and connect the sealing device 138E to the cap 112'.

In an example embodiment, the sealing device 138E is structured to fit within an interior region of the cap 112' that is bounded by a rim portion of the cap 112'. In this regard, for example, the sealing device 138E has a generally round shape or any suitable shape for the cap 112'. In an example embodiment, the sealing device 138E comprises a brake fluid compatible rubber material (e.g., EPDM), any suitable material, or any combination thereof. In this regard, for instance, the sealing device 138E is configured to also serve and function as a diaphragm. More specifically, in an example embodiment, the sealing device 138E includes at least the aperture 180, the slit 134, and a chamber 178. For example, in the example embodiment shown in FIGS. 8B and 9B, the slit, the aperture 180, and the chamber 178 are aligned along the sealing device 138E. In an example embodiment, as discussed earlier, the sealing device 138E includes at least one aperture 180, which is configured to receive the pin 176 of the cap 112' so that the sealing device 138E is configured to move (e.g., rotate) about the pin 176 into the unsealed position and the sealed position, respectively. When the sealing device 138E is in the unsealed position, the slit 134 is aligned with at least the channel 124 so that the slit 134 is in communication with the vent 122 via the channel 124 as shown in region 210 of FIG. 8A, as well as at FIG. 8B. In contrast, when the sealing device 138E is in the sealed position, the slit 134 is neither aligned nor in communication with the channel 124 so that the slit 134 is blocked by a corresponding surface portion of the cap 112' and the channel is 124 blocked by a corresponding surface portion of the sealing device 138E, as shown in region 220 of FIG. 9A, as well as at FIG. 9B In an example embodiment, the chamber 178 is buoyant and offset from the rotational axis 330. In this regard, for example, the chamber 178 is a buoyant sealed vessel, which is connected to or integral with the sealing device 138E. As one example, the chamber 178 is sealed with air, thereby providing the sealing device 138E with a buoyant air pocket. With at least these features, the chamber 178 is configured to influence a position of the sealing device 138E based at least on a fluid level of the container 148'. For instance, when the fluid level within the container 148' transitions to a lower level 350 that does not affect or contact at least the chamber 178 and/or sealing device 138E (e.g., FIG. 8A), then the sealing device 138E is configured to transition to and move into the unsealed position (e.g., FIG. 8B) via the imbalance provided by the weight of the chamber 178. In contrast, when the fluid level within the container 148' is at a higher level 360 that interacts with and contacts at least the chamber 178 and/or the sealing device 138E (e.g., FIG. 9A), then the sealing device 138E is configured to transition to and move into the sealed position (e.g. FIG. 9B) via the buoyancy and lifting of the chamber 178. Accordingly, as discussed above, the sealing device 138E is advantageously configured to move into the unsealed position to provide pressure balancing via the vent system of the reservoir 100. In addition, the sealing device 138E is advantageously configured to move into the sealed position to provide an effective seal for the vent system of the reservoir 100, thereby preventing leakage of fluid from the reservoir 100.

As described above, the reservoir 100 together with the sealing device 138 includes a number of advantageous features, as well as benefits. For example, the sealing device 138 is configured to prevent, fluid (e.g., brake fluid) from directly contacting and passing through the slit 134. This is particularly beneficial in preventing fluid spillage or leakage from the reservoir 100 in various conditions (e.g., anti-lock braking, acceleration, deceleration, etc.) in which the fluid may move and splash around in the reservoir 100.

Also, in an example embodiment, the sealing device 138 is disposed near an opening 118 in the reservoir 100, thereby being easily accessible. This feature is beneficial in various scenarios, such as when removing, cleaning, replacing, or performing any action with respect to the sealing device 138. Advantageously, the sealing device 138 is compact and thus does not occupy substantial space within the reservoir 100. In this regard, the sealing device 138 is configured to fit within the neck portion 102/102' of the container 148. Also, in an example embodiment, the sealing device 138 is connected to the cap 112/112' such that the sealing device 138 is removed with the cap 112/112' and does not interfere with the input/output of fluid via the opening in the container 148/148'.

In addition, as another advantage, in an example embodiment, the sealing device 138 includes the holder 140/140', which is configured to guide the sealed vessel 142/142' such that the sealed vessel 142/142' is continuously directed to move along the quickest and shortest route from the unsealed position to the sealed position, and vice versa. That is, the holder 140/140' is configured to hold the sealed vessel 142/142' in alignment with the cap 112/112' irrespective of the fluid level (or lack thereof) within the container 148. Also, the holder 140/140' is advantageously configured to ensure that the sealed vessel 142/142' remains at a suitable and/or optimal distance away from the diaphragm 126 when there is no fluid in contact with the sealed vessel 142 (e.g., when the fluid level is low or when there is no fluid in the container 148). In addition, the holder 140/140' is configured to ensure that the sealed vessel 142/142' remains within an appropriate region (e.g., neck portion 102) of the container 148 and does not interfere with other components (e.g., filter 114). In this regard, the holder 140/140' is configured to be positioned within the container 148 to provide a suitable amount of space between the sealed vessel 142/142' and the filter 114. Also, in another example embodiment, the sealing device 138E includes a pin 176, which is configured to direct and guide the sealing device 138E about the rotational axis 330 so that the sealing device 138E can effectively transition into the unsealed position and the sealed position, respectively.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A reservoir comprising:
   a container including a neck portion that extends from a body of the container, the neck portion including an opening that provides access to an interior of the container;
   a cap structured to interact with the neck portion, the cap including a vent for pressure balancing of the reservoir;
   a diaphragm including a slit in communication with the vent; and
   a sealing device including
   a sealed vessel that includes a sealing member sealed by a seal, the sealed vessel being movable to at least a first position such that the sealed vessel physically contacts the diaphragm to seal the slit and a second position such that the sealed vessel is spaced from the diaphragm to unseal the slit, and a holder that is configured to hold the sealed vessel in alignment with the cap and maintain a fixed position within the container when the sealed vessel moves from the first position to the second position and when the sealed vessel moves from the second position to the first position.

2. The reservoir of claim 1, wherein the holder includes a rim portion that is structured to mate with a groove of the cap such that the holder is secured to the cap.

3. The reservoir of claim 2, wherein a cross-section of the holder is smaller than a cross-section of the neck portion such that there is clearance between an outer sidewall of the holder and an inner sidewall of the neck portion.

4. The reservoir of claim 2, wherein:

the holder includes a guide slot to hold the sealed vessel; and a width of the rim portion of the holder is wider than a width of a portion of the holder that includes the guide slot.

5. The reservoir of claim 1, wherein the holder includes a rim portion that is structured to engage with inner surface portions of the container such that the holder is secured to the container.

6. The reservoir of claim 1, wherein the holder includes at least one passageway to enable fluid flow and pressure balancing via the slit and the vent.

7. The reservoir of claim 1, wherein the sealed vessel is buoyant such that the sealed vessel is configured to move in accordance with variations in fluid levels of fluid within the container.

8. The reservoir of claim 1, further comprising:

a filter to prevent foreign particles from contaminating the reservoir;

wherein:

the sealed vessel is disposed between the filter and the cap, and the holder is disposed between the filter and the cap.

9. A braking system comprising:

at least one braking device; and a reservoir connected to the at least one braking device, the reservoir including:

a container including a neck portion that extends from a body of the container, the neck portion including an opening that provides access to an interior of the container;

a cap structured to interact with the neck portion, the cap including a vent for pressure balancing of the reservoir;

a diaphragm including a slit in communication with the vent; and a sealing device including a sealed vessel that includes a sealing member sealed by a seal, the sealed vessel being movable to at least a first position such that the sealed vessel physically contacts the diaphragm to seal the slit and a second position such that the sealed vessel is spaced from the diaphragm to unseal the slit, and a holder that is configured to hold the sealed vessel in alignment with the cap and maintain a fixed position within the container when the sealed vessel moves from the first position to the second position and when the sealed vessel moves from the second position to the first position.

10. The braking system of claim 9, wherein the holder includes a rim portion that is structured to mate with the groove of the cap such that the holder is secured to the cap.

11. The braking system of claim 10, wherein a cross-section of the holder is smaller than a cross-section of the neck portion such that there is clearance between an outer sidewall of the holder and an inner sidewall of the neck portion.

12. The braking system of claim 10, wherein:

the holder includes a guide slot to hold the sealed vessel; and a width of the rim portion of the holder is wider than a width of a portion of the holder that includes the guide slot.

13. The braking system of claim 9, wherein the holder includes a rim portion that is structured to engage with inner surface portions of the container such that the holder is secured to the container.

14. The braking system of claim 9, wherein the holder includes at least one passageway to enable pressure balancing via the slit and the vent in accordance with a change in fluid level within the reservoir.

15. The braking system of claim 9, wherein the sealed vessel is buoyant such that the sealed vessel is configured to move in accordance with variations in fluid levels of fluid within the container.

16. The braking system of claim 9, further comprising:

a filter to prevent foreign particles from contaminating the reservoir;

wherein the sealing device is disposed between the filter and the cap.

* * * * *